(12) United States Patent
Yang et al.

(10) Patent No.: US 8,327,182 B2
(45) Date of Patent: Dec. 4, 2012

(54) SYSTEMS AND METHODS FOR RECOVERING INFORMATION FROM NAND GATES ARRAY MEMORY SYSTEMS

(75) Inventors: Qing Yang, Saunderstown, RI (US); Weijun Xiao, Kingston, RI (US)

(73) Assignee: The Board of Governors for Higher Education, The State of Rhode Island and Providence Plantations, Providence, RI (US)

( * ) Notice: Subject to any disclaimer, the term of this patent is extended or adjusted under 35 U.S.C. 154(b) by 0 days.

(21) Appl. No.: 12/910,132

(22) Filed: Oct. 22, 2010

(65) Prior Publication Data

US 2011/0055626 A1 Mar. 3, 2011

Related U.S. Application Data

(63) Continuation of application No. PCT/US2009/043271, filed on May 8, 2009.

(60) Provisional application No. 61/053,282, filed on May 15, 2008.

(51) Int. Cl.
G06F 11/00 (2006.01)
(52) U.S. Cl. .......................... 714/6.1; 714/6.11
(58) Field of Classification Search ............ 714/6.1, 714/6.11, 6.2
See application file for complete search history.

(56) References Cited

U.S. PATENT DOCUMENTS

| | | | |
|---|---|---|---|
| 6,970,890 B1 | 11/2005 | Bruce et al. | |
| 7,620,844 B2 * | 11/2009 | Mambakkam et al. | 714/6.12 |
| 2005/0144516 A1 * | 6/2005 | Gonzalez et al. | 714/8 |
| 2008/0104308 A1 * | 5/2008 | Mo et al. | 711/103 |

FOREIGN PATENT DOCUMENTS
WO WO2009140157 A2 11/2009

OTHER PUBLICATIONS

International Preliminary Report on Patentability based on International Application No. PCT/US2009/043271 with an International filing date of May 8, 2009, 8 pages.
Breeuwsma, Forensic Data Recovery from Flash Memory, Small Scale Digital Device Forensics Journal, Jun. 2007, pp. 1-17,vol. 1, No. 1, Netherlands.
Rock et al., Shorten Your backup Window, Storage Magazine Special Issue on Managing the Information That Drives the Enterprise, Sep. 2005, 4 pages, Tech Target, USA.
Duzy, Match Snaps to Apps, Storage Magazine Special Issue on Managing the Information that Drives the Enterprise, Sep. 2005, 7 pages, Tech Target, USA.

(Continued)

*Primary Examiner* — Yolanda L Wilson
(74) *Attorney, Agent, or Firm* — Gesmer Updegrove LLP

(57) ABSTRACT

A method is disclosed for recovering data associated with a damaged file stored in a NAND gate array memory. The method includes the steps of: identifying all meta data associated with the damaged file; identifying each logical block address of all identified meta data; collecting all physical block addresses associated with one of the identified logical block addresses or the identified meta data; counting in a replace table (ReplTable) a number of matches to a physical block address of the damaged file for each physical block address of the damaged file; choosing a block in a linked list that corresponds to the physical block address of the block in the linked list; and linking all chosen blocks to form a replicated file.

20 Claims, 5 Drawing Sheets

OTHER PUBLICATIONS

Chervenak et al., Protecting File Systems: A Survey of Backup Techniques, Proceedings of Joint NASA and IEEE Mass Storage Conference, 1998, 20 pages, IEEE, USA.

Memory Card Data Recovery, www.mjmdatarecovery.co.uk/memorydatarecovery.html., retrieved Dec. 9, 2010, 3 pages.

www.eprovided.com, Digital Image Recovery, USB Data Recovery, Digital Photo Recovery, 6 pages, retrieved Dec. 15, 2010, USA.

Yang et al., Trap-Array: A Disk Array Architecture Providing Timely Recovery to Any Point-in-time, Proceedings of the 33rd International Symposium on Computer Architecture (ISCA 2006), 2006, 12 pages, USA.

Xiao et al., Can We Really Recover Data If Storage Subsystem Fails?, ICDCS 2008, 2008, pp. 1-8, USA.

\* cited by examiner

SYSTEMS AND METHODS FOR RECOVERING INFORMATION FROM NAND GATES ARRAY MEMORY SYSTEMS

PRIORITY

The present application is a continuation application of PCT/US2009/043271 filed on May 8, 2009, which claims priority to U.S. Provisional Patent Application Ser. No. 61/053,282 filed May 15, 2008, the entire disclosure of which is hereby incorporated by reference.

GOVERNMENT SUPPORT

The invention was made with government support under Grants Nos. CCR-0073377, CCR-0312613 and SGER 0610538, each awarded by the National Science Foundation. The United States government has certain rights to this invention.

BACKGROUND

The invention generally relates to data recovery systems, and relates in particular to data recovery systems for NAND gate array memories.

NAND gate array memories are a popular technology used in flash memories due, in part, to their low cost and high density (up to 16 Gb per chip). The technology has been used widely in handheld devices such as USB drives, cell phones, touch phones, iPod™ devices and iPhones™ devices sold by Apple, Inc. of Cupertino, Calif., etc. Further future computing devices such as laptops may also include such memory devices. Users store important information on these storage devices such as emails, photos, financial information, and personal data.

Device failures, however, such as hardware faults, OS failures, physical damages, virus attacks, and user errors sometimes occur resulting in data damages or data losses. Moreover, the charge stored in each floating gate of each transistor in a NAND gate array memory will leak in time, and blocks within each NAND gate array memory sometimes become damaged during use (e.g., during writing and erasing operations). For these reasons, NAND gate array memories are typically provided with spare memory area such that a bad block may be labeled as such, and data may instead be diverted to good blocks within the NAND gate array memory. More importantly, each block in an NAND gate array flash has limited number of erase cycles (10,000 for MLC and 100,000 for SLC). A process called wear leveling is typically employed to spread the use of data blocks as uniformly as possible to provide that the blocks wear out more evenly. When transistors and blocks become damaged, however, data therein will be lost. There is a need, therefore, for techniques to recover data from such NAND gate array memories in case of failures. Furthermore, there is also a need in computer forensics to recover data evidence from such handheld devices in case of physical damages or files having been deleted.

Handheld devices are typically not as well protected as traditional storages such as disks, which may be maintained in air-conditioned data centers and may be managed by information technology (IT) professionals. Mature data protection technologies such as traditional backup, snapshot techniques, continuous data protection (CDP), timely recovery to any point-in-time (TRAP) array, and Coupling Update by Parities (CUP) data technologies are available to protect data stored in hard disk drives and data can be recovered in case of failures.

Handheld devices are used by the general public, and as a result, failures such as hardware faults, physical damages, and user errors occur more frequently than with hard disks that are maintained by IT professionals. In addition, majority of users do not do backup or snapshot for data stored on these handheld devices. Recovering data from such NAND gate array memories presents significant technical challenges.

U.S. Published Patent Application Publication No. 2008/0104308, for example, discloses a technique to rebuild the block mapping table for the purpose of providing a quick reboot from flash memory in the event that the mapping table is lost in the RAM memory. During rebooting, the latest updated wear-sorted block list (WSBL) is read from non-volatile cache memory, and then the block mapping data is restored with reference to erasing counts for the blocks. The system does not, however, provide for the recovery of data stored in a flash memory to a previous point in time.

U.S. Pat. No. 6,970,890 discloses a method of using base block copies to define the location of selected data structures used for file system management. The method uses at least two of the base block copies to provide redundancy so that in the event one of the copies cannot be located or verified, the other copy can be used to rebuild the defective base block copy. This scheme, however, requires modification of file systems to provide redundancy.

In an article titled *Forensic Data Recovery From Flash Memory*, by M. Breeuwsma, de Jongh, Martien, Klayer, Coert, van der Knijff, Ronald, Roeloffs, Mark, Small Scale Digital Device Forensics Journal, vol. 1, no. 1 (June 2007), it is disclosed that three low-level data acquisition methods may be employed for making full memory copies of flash memory devices. Steps are also disclosed therein for translating the extracted data into a format that may be understood by common forensic media analysis tools. The systems of this article, however, do not make the raw data readable by upper layer file systems, and further are not able to recover data to a previous point in time by tracing the block logs that exist in NAND gate array memories and are invisible to file systems or users.

There remains a need therefore, for a data recovery system for flash memory storage that is able to recover data to a previous point in time in case of failures.

SUMMARY

In accordance with an embodiment, the invention provides a method for recovering data associated with a damaged file stored in a NAND gate array memory. The method includes the steps of: identifying all meta data associated with the damaged file; identifying each logical block address of all identified meta data; collecting all physical bock addresses associated with one of the identified logical block addresses or the identified meta data; counting in a replace table (ReplTable) a number of matches to a physical block address of the damaged file for each physical block address of the damaged file; choosing a block in a linked list that corresponds to the physical block address of the block in the linked list; and linking all chosen blocks to form a replicated file. In accordance with another embodiment, the number of matches to a physical block address of the damage file for each physical block address of the damaged file is (MatchNo), and the step of choosing a block in a linked list that corresponds to the physical block address of the block in the linked list involves choosing the $(MatchNo+1)^{th}$ block in the linked list for each physical block address of the damaged file.

In accordance with another embodiment, the invention provides a system for recovering data associated with a damaged file stored in a NAND gate array memory. The system includes: meta data identification means for identifying all meta data associated with the damaged file; logical block address means for locating each logical block address of all identified meta data; collecting means for collecting all physical bock addresses associated with one of the identified logical block addresses or the identified meta data; counting means for counting in a replace table (ReplTable) a number of matches to a physical block address of the damaged file for each physical block address of the damaged file; selection means for choosing a block in a linked list that corresponds to the physical block address of the block in the linked list; and linking means for linking all chosen blocks to form a replicated file.

BRIEF DESCRIPTION OF THE ILLUSTRATED EMBODIMENTS

The following description may be further understood with reference to the accompanying drawings in which.

Figure 5:
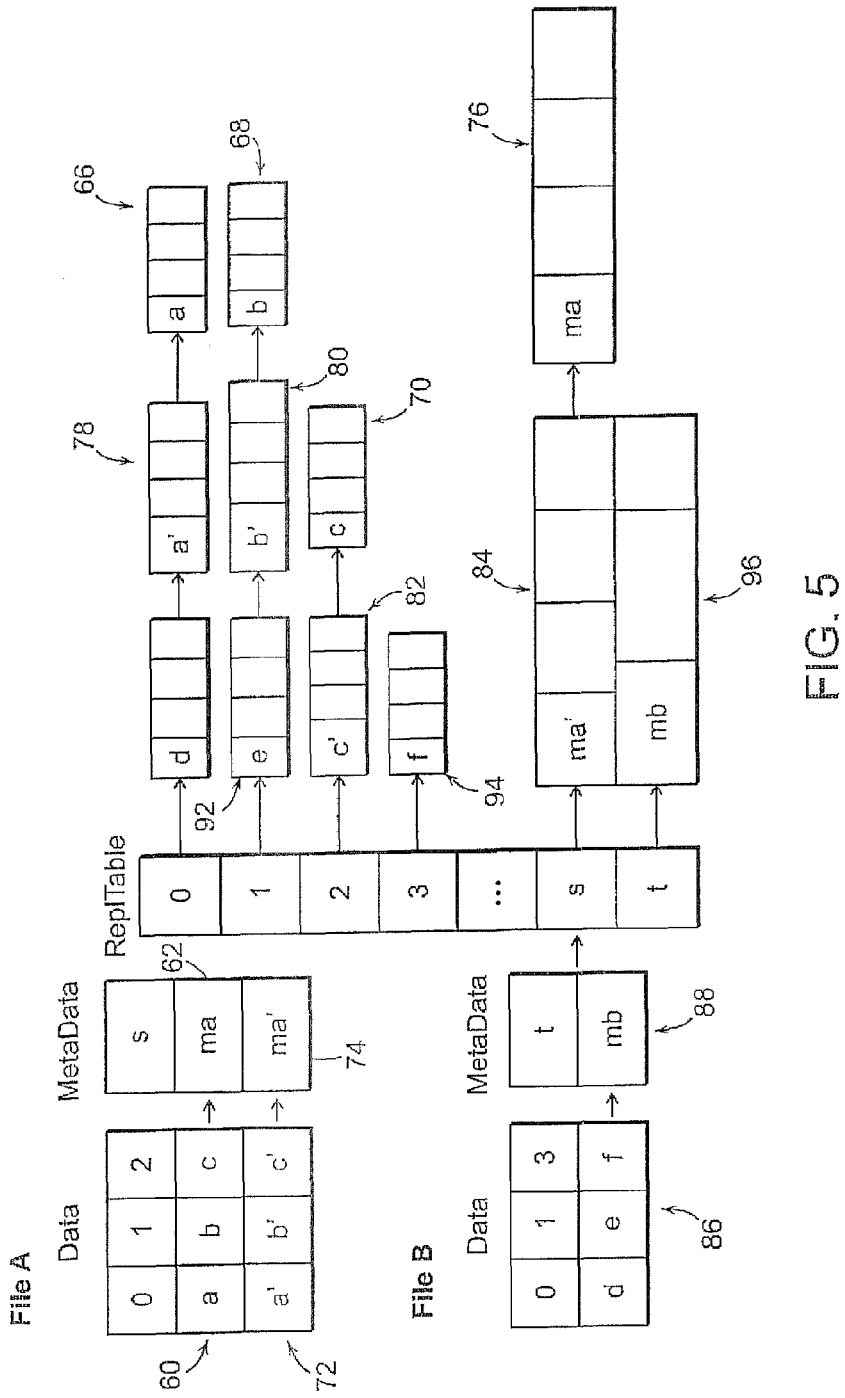
Figure 6:
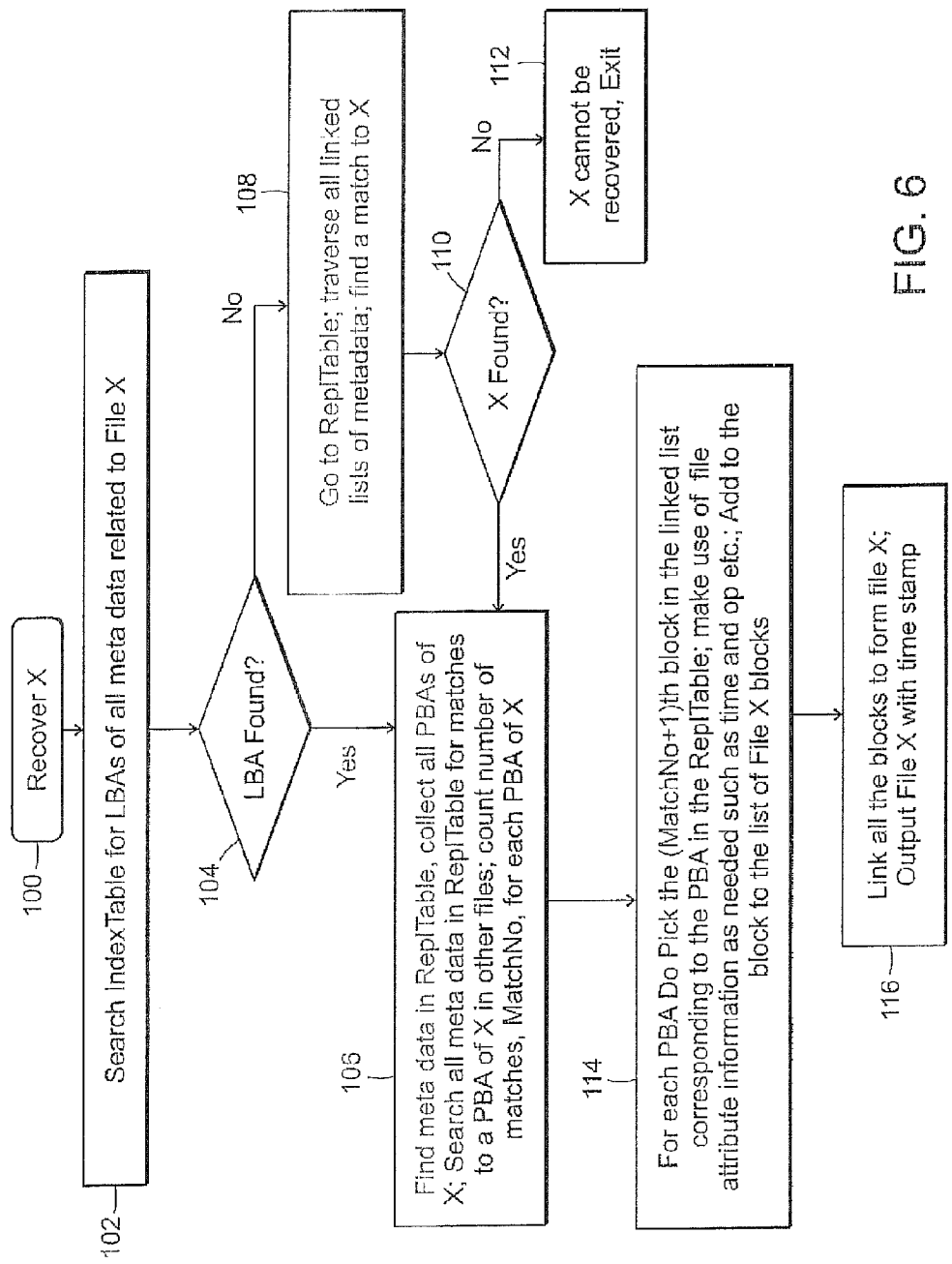

FIG. 5 shows an illustrative diagrammatic view of an address mapping technique for a NAND gate array memory in accordance with an embodiment of the invention wherein a first file is created, then changed, then deleted, and then a new file is created; and FIG. 6 shows an illustrative diagrammatic view of procedural steps employed in a NAND gate array data recovery system in accordance with an embodiment of the invention.

The drawings are shown for illustrative purposes only.

DETAILED DESCRIPTION

A data recovery system and method are disclosed to recover NAND gate array data to a previous point in time in case of failures. Based on observations of physical properties of NAND gate arrays, the technique takes advantages of wear leveling and performance considerations. The technique is able to recover data to a previous point in time in case of data loss and/or damage by reconstructing index structures and locating corresponding data blocks from a NAND gate array at the file system level. The technique is believed to work on all NAND gate array memories, and is able to recover data from NAND gate array memories in case of data damages caused by hardware failures, user errors, operating system crashes, and virus attacks etc. The technique also works at both file system level and the physical layer level of flash memories.

An approach of the present invention is to make use of existing file system and wear leveling at the physical layer with no explicit data redundancy provided at the file system level to recover data. The approach takes advantages physical level properties to recover data from logs of blocks to a previous point in time.

Figure 1:
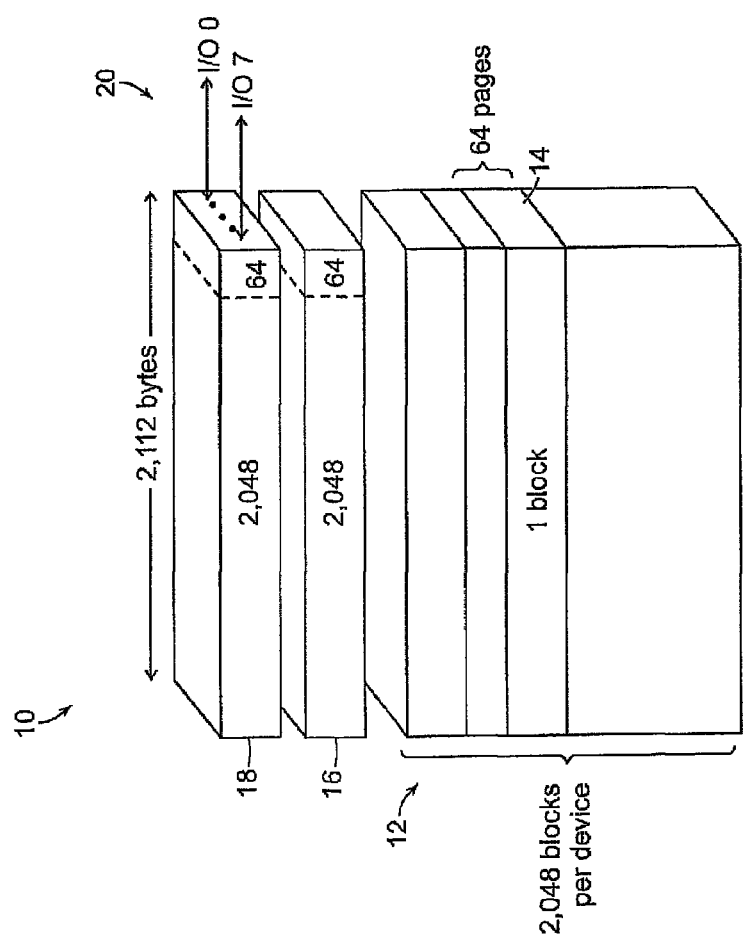
FIG. 1 shows an illustrative diagrammatic view of a 2 Giga byte NAND gate array memory with which techniques of the invention may be employed.

FIG. 1 shows the organization of a physical layer of a NAND gate array. As shown in FIG. 1, a physical layer of a 2 Giga byte NAND gate array storage 10 for use as flash memory includes a user data portion 12 having, for example, 2,048 blocks per device, and each block 14 may contain 64 pages. Each page contains 2 k bytes of memory, plus 64 bytes of spare memory. Each block, therefore, contains 128 k bytes of memory, plus 4 k bytes of spare memory. Blocks are the smallest erasable units and pages are the smallest programmable units. The NAND gate array storage 10 also includes a data register 16 and a cache register 18. Input and output operations (e.g., in 8 bit bytes) are executed through the cache register 18 as shown at 20, and the data register 16 maintains the routing and addressing of the data to good blocks in the user data portion 12.

When a write operation is performed, the system first finds a free page to which the data will be written. If there is no free page available, then an erase operation is necessary to create free pages. Read operations usually takes about 25 microseconds whereas erase operation takes 1.5 to 3 milliseconds. For performance considerations, the controller inside a flash memory always tries to delay executing erase operations as long as possible by searching for available free pages.

Figure 2:
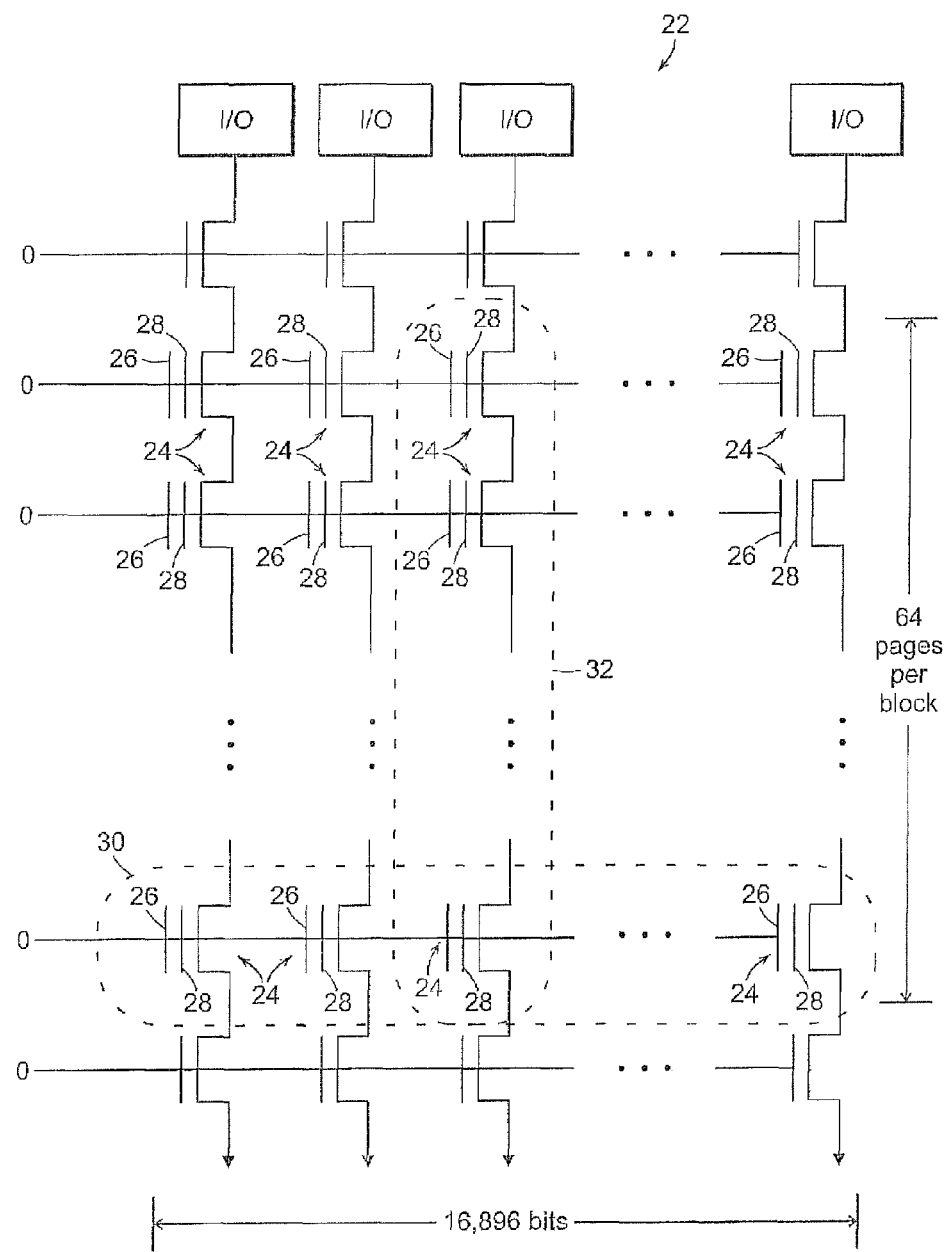
FIG. 2 shows an illustrative diagrammatic view of an internal structure of a NAND gate array block with which techniques of the invention may be employed.

FIG. 2 shows the architecture of a block 22 in a NAND gate array memory. Each transistor 24 provides a memory cell and includes a control gate 26 and a floating gate 28. When erased, each cell stores a high value of one. A page is shown at 30 and a string is shown at 32.

Another important physical property of each block is that the lifetime of the flash memory is limited by the number of erase operations performed on a block. Typically, a block can be erased only 10 k or 100 k times in its lifetime. After that, the block becomes bad. For example, if a block were erased and reprogrammed every minute, every day for seven days (60× 24×7=10,080), then the number of erase operations may exceed the lifetime of that block—in just 7 days. As mentioned above, in order to improve the lifetime of a flash memory, wear leveling is typically done by distributing erase operations more evenly across all blocks. For example, for the same flash memory with the life of 10 k erases, if erase operations are distribute to all 4 k blocks, then (10,000*4,096)/(24*60)=28,444 days, which translates to 77.9 years of storage life. Wear leveling is therefore an important feature that is implemented in most NAND gate array memories.

When a file system is built on NAND gate array memories, a device driver is needed to provide block level services between a file system and the NAND gate array. This device driver (which includes the data register 16 and cache register 18 of FIG. 1) is responsible for address mapping, raw data block reading and writing, and wear leveling. There are two core data structures involved in the implementation of a NAND device driver: an enumeration table (ENUTable) and a replace table (ReplTable). The ENUTable stores the mapping information from logical block address to physical block address. The ReplTable makes a linked list to store the log of blocks for each physically erasable block.

Figure 3:
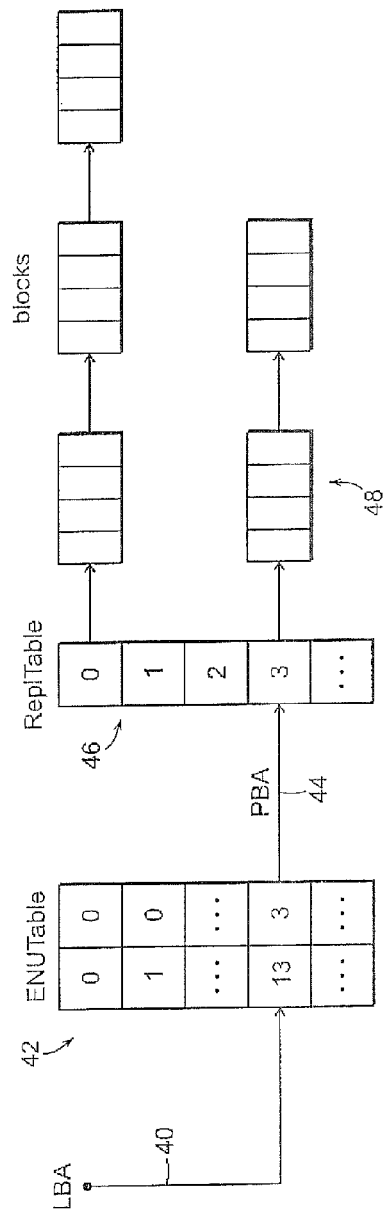
FIG. 3 shows an illustrative diagrammatic view of an address mapping technique for a NAND gate array memory in accordance with an embodiment of the invention.
Figure 4:
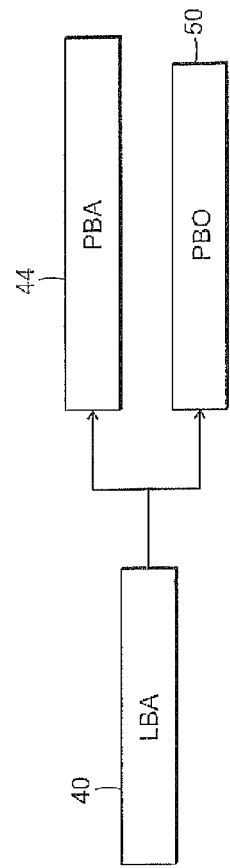
FIG. 4 shows an illustrative diagrammatic view of a relationship between a logical block address, a physical block address and a physical block offset in accordance with an embodiment of the invention.

FIG. 3 shows the indexing and data structures of a typical NAND gate array storage. A logic block address (LBA) 40 is addressed in the ENUTable 42. An associated physical block address (PBA) 44 is then used by the ReplTable 46 to access an available block 48. Each LBA (is therefore associated with a PBA 44 as well as a physical block offset (PBO) 50 as shown in FIG. 4.

The read and write operations of the NAND gate arrays are executed as follows. When a read request is received, the device driver looks up the address in the ENUTable 42 and translates the LBA 40 address into physical block address. By retrieving corresponding linked list for the PBA 44, the data block storing the newest data is selected and is returned to the file system. When a write request is issued by the upper layer file system, the device driver tries to find a free page in a free data block to store the new data and inserts this data block into the corresponding linked list of the physical block address. When storage space is used up and a free data block cannot be found, the wear leveling algorithm will be performed. All data blocks in the longest linked list will be erased after all data blocks in the linked list are merged. During the merge process, only the freshest data is kept at one physical data block. All physical data is, therefore, updated out of place, which is different from the update-in-place procedure used by traditional hard disks.

The present invention leverages the indexing structure and the physical placement of data pages. The logs of blocks built in NAND gate array storage for the purpose of wear leveling and performance considerations provide us with opportunities to recover data to a previous good point in time in case of hardware failures, virus attacks, and user error etc. When a file is changed and then deleted, information is recorded. As shown in FIG. 5, for example, when File A is originally saved having data a, b, c (as shown at 60), metadata ma (as shown at 62) is created. The ReplTable 64 assigns blocks 66, 68, 70 for storing the data a, b, c, and assigns meta data ma to a meta data block 76. When File A is later changed to a', b', c' (as shown at 72), metadata ma' (as shown at 74) is created, and the ReplTable 64 assigns new blocks 78, 80, 82 for storing the data a', b', c', and assigns meta data ma' to a meta data block 84. Now, when File A is deleted, and new File B having data d, e, f is created (as shown at 86), new meta data mb is created as shown at 88. The ReplTable 64 then assigns blocks 90, 92, 94 for storing the data d, e, f, and assigns meta data mb to a meta data block 96. While all physical data are updated out of place, the prior data from File A, the prior original data (a, b, c) or the changed data (a', b c') of File A may be recovered.

The recovery algorithm works as follows using conventional computer processing hardware that accesses the NAND gate array memory via, for example, a universal serial bus (USB) connection. With reference to FIG. 6, the process of recovering a file X starts (step 100) by looking up the data structures in a file system using, for example, a file allocation table (FAT) to find all metadata information of the recovered file and corresponding LBAs (step 102). If a corresponding LBA is found (step 104), then the system finds the associated meta data in the ReplTable, collects all PBAs of file X, searches all meta data in ReplTable for matches to a PBA of X in other files, and counts the number of matches (MatchNo) for each PBA of X (step 106).

If no corresponding LBA is found (step 104), then the system goes to ReplTable; traverses all linked lists of meta data and looks for a match to X (step 108). If no match is found (step 110), then the system provides an indication that File X cannot be recovered (step 112). If a match is found (step 110), then the system proceeds to step 106 and finds the associated meta data in the ReplTable, collects all PBAs of file X, searches all meta data in ReplTable for matches to a PBA of X in other files, and counts the number of matches (MatchNo) for each PBA of X.

Based on the meta data information, the ENUTable is used to locate the physical locations of all metadata to the file, and all physical addresses therefore of the data blocks belonging to the File X are collected (step 106). While looking for the metadata, file attribute information (such as times of creation and changes made to the file) is also retrieved and analyzed. This information will be used in reconstruction of the file to be recovered. At the same time, A counter (MatchNo) is maintained for the number of appearances of the same physical block address (PBA) in the metadata list.

This value MatchNo provides the number of overwrites to the data block to be recovered by the file system. This value is used to pick up the data block of the recovered file in the linked list by traversing the corresponding linked list of the PBA and selected the $(MatchNo+1)^{th}$ element in the linked list for recovery purpose (step 114). In this way, all data blocks of the file X to be recovered are collected. Thereafter, all the data blocks are collected, and the File X is reconstructed (step 116). It is also possible to recover only a part of a file. If the logs of all data blocks have been erased, then the file may not be recovered.

With reference again to FIG. 5, wherein File A was first created and later changed, then deleted and then partially overwritten with File B, because the file system considers File A having been deleted, it may allocate the same LBAs for d and e of File B as a and b of File A, respectively. In the traditional storage, the write operations of d and e of file B would have overwritten a and b of File A. But, in the NAND gate array flash storage, b and c of File A are not overwritten but linked in the linked list as shown at 68 and 70. Similarly, the new metadata of file A, ma', did not overwrite the old meta data of File A, ma. By tracing back the meta data and the linked blocks, we are able to recover File A as it was before the first changes were made, i.e., File A consists of data a, b, and c, or as it was after the first changes were made, i.e., File A consists of a', b', c'. During the file reconstruction process, file attribute information in metadata may be used to facilitate the recovery process.

Hand held devices such as USB drive, PDA, cell phones, iPod, iPhones and TouchPhones etc use NAND gate array flash memory to store information. Some of the information is very important to users or to businesses. It is important, therefore, to keep this important information safe, reliable and recoverable in case of failures. The techniques disclosed herein provide a method of recovering data from such NAND Gate array memories in case of data damage caused by hardware failures, user errors, operating system crash, and virus attacks. The technique works at both file system level and physical device level to recover deleted or damaged data in a flash storage. By leveraging the physical properties such as wear leveling and slow erases, data may be recovered to a previous point in time when the data was not lost or corrupted.

Those skilled in the art will appreciate that numerous modifications and variations may be made to the above disclosed embodiments without departing from the spirit and scope of the invention.

What is claimed is:

1. A method of recovering data associated with a damaged file stored in a NAND gate array memory, said method comprising the steps of:

identifying all meta data associated with the damaged file;
    identifying each logical block address of all identified meta data;
    collecting all physical block addresses associated with one of the identified logical block addresses or the identified meta data;
    counting in a replace table (ReplTable) a number of matches to a physical block address of the damaged file for each physical block address of the damaged file, said replace table assigns meta data to a meta data block for each file;
    choosing a block in a linked list that corresponds to the physical block address of the block in the linked list; and
    linking all chosen blocks to form a replicated file.

2. The method as claimed in claim 1, wherein said method collects all physical block addresses associated with the identified logical block addresses.

3. The method as claimed in claim 1, wherein said method further includes the step of traversing all linked lists of meta data in the replace table (ReplTable) to identify meta data that is associated with the damaged file.

4. The method as claimed in claim 3, wherein said method collects all physical block addresses associated with the identified meta data.

5. The method as claimed in claim 1, wherein number of matches to the physical block address of the damaged file for each physical block address of the damaged file, is employed in the step of choosing a block in a linked list that corresponds to the physical block address of the block in the linked list.

6. The method as claimed in claim 1, wherein said method further includes the step of retrieving file attribute information regarding the damaged file.

7. The method as claimed in claim 1, wherein said method further includes the step of providing an output of the recovered file with a time stamp.

8. The method as claimed in claim 1, wherein said method further includes the step of storing mapping information in an enumeration table (ENUTable) from the logical block address to the physical block address to reconstruct an index structure.

9. A method of recovering data associated with a damaged file stored in a NAND gate array memory, said method comprising the steps of:
   identifying all meta data associated with the damaged file;
   identifying each logical block address of all identified meta data;
   collecting all physical block addresses associated with one of the identified logical block addresses or the identified meta data;
   counting in a replace table (ReplTable) a number (MatchNo) of matches to a physical block address of the damage file for each physical block address of the damaged file, said replace table assigns meta data to a meta data block for each file;
   choosing a block in a linked list that corresponds to the physical block address of the block in the linked list by choosing the (MatchNo+1)$^{th}$ block in the linked list for each physical block address of the damaged file; and
   linking all chosen blocks to form a replicated file.

10. The method as claimed in claim 9, wherein said method collects all physical block addresses associated with the identified logical block addresses.

11. The method as claimed in claim 9, wherein said method further includes the step of traversing all linked lists of meta data in the replace table (ReplTable) to identify meta data that is associated with the damaged file.

12. The method as claimed in claim 11, wherein said method collects all physical block addresses associated with the identified meta data.

13. The method as claimed in claim 9, wherein said method further includes the step of retrieving file attribute information regarding the damaged file.

14. The method as claimed in claim 9, wherein said method further includes the step of providing an output of the recovered file with a time stamp.

15. The method as claimed in claim 9, wherein said method further includes the step of storing mapping information in an enumeration table (ENUTable) from the logical block address to the physical block address to reconstruct an index structure.

16. A system for recovering data associated with a damaged file stored in a NAND gate array memory, said system comprising computer processing hardware configured to perform the functions of:
   identifying all meta data associated with the damaged file;
   locating each logical block address of all identified meta data;
   collecting all physical block addresses associated with one of the identified logical block addresses or the identified meta data;
   counting in a replace table (ReplTable) a number of matches to a physical block address of the damaged file for each physical block address of the damaged file, wherein said replace table assigns meta data to a meta data block for each file;
   choosing a block in a linked list that corresponds to the physical block address of the block in the linked list; and
   linking all chosen blocks to form a replicated file.

17. The system as claimed in claim 16, wherein said function of collecting all physical block addresses includes collecting all physical block addresses associated with the identified logical block addresses.

18. The system as claimed in claim 16, wherein said computer processing hardware is further configured to perform the function of traversing means for traversing all linked lists of meta data in the replace table (ReplTable) to identify meta data that is associated with the damaged file.

19. The system as claimed in claim 18, wherein said function of collectin all physical block addresses includes collectin all physical block addresses associated with the identified meta data.

20. The system as claimed in claim 16, wherein said computer processing hardware is further configured to perform the function of mapping information in an enumeration table (ENUTable) from the logical block address to the physical block address to reconstruct an index structure.

* * * * *